United States Patent [19]

Ochs

[11] Patent Number: 5,632,466

[45] Date of Patent: May 27, 1997

[54] PISTON ACTUATED PRESSURE REDUCING VALVE

[76] Inventor: Paul Ochs, 19 Tall Timber Dr., Morristown, N.J. 07960

[21] Appl. No.: 497,533

[22] Filed: Jun. 30, 1995

[51] Int. Cl.⁶ ........................ F16K 31/143; F16K 31/163
[52] U.S. Cl. ........................................ 251/63.5; 251/63.6
[58] Field of Search ........................... 251/63, 63.5, 63.6

[56] References Cited

U.S. PATENT DOCUMENTS

| | | |
|---|---|---|
| 3,232,313 | 2/1966 | Bering . |
| 3,495,501 | 2/1970 | Kure-Jensen . |
| 3,518,032 | 6/1970 | DeGroff et al. . |
| 3,982,559 | 9/1976 | Ochs . |
| 3,993,284 | 11/1976 | Lukens ............................ 251/63.6 |
| 4,040,600 | 8/1977 | Coppola et al. . |
| 4,067,348 | 1/1978 | Davis . |
| 4,172,582 | 10/1979 | Bobnar . |
| 4,216,793 | 8/1980 | Volgstadt et al. . |
| 4,290,578 | 9/1981 | Earp et al. . |
| 4,315,506 | 2/1982 | Kayser et al. . |
| 4,508,132 | 4/1985 | Mayfield ...................... 251/63.6 X |
| 4,659,061 | 4/1987 | Scheffel . |
| 4,669,702 | 6/1987 | Tripp . |
| 4,694,730 | 9/1987 | Krieger et al. . |
| 4,763,690 | 8/1988 | Martin ........................... 251/63.6 X |
| 4,828,219 | 5/1989 | Ohmi et al. .................... 251/63.5 X |
| 5,131,627 | 7/1992 | Kolenc ......................... 251/63.6 X |

*Primary Examiner*—Hoang Nguyen
*Attorney, Agent, or Firm*—Darby & Darby

[57] ABSTRACT

A valve includes a housing having an inlet and an outlet for the flow of a first fluid therethrough. A cup-shaped cover dome is attached to the housing. The cover dome has a cylindrical bore. A valve stem has a plug to regulate the flow of the first fluid through the housing. A piston is connected to the valve stem. The piston is reciprocatably received within the cylindrical bore of the cover dome to define a first chamber disposed between the piston and the housing and a second chamber disposed between the piston and the cover dome. The piston has a sliding circumferential surface received in an inner surface of the cylindrical bore. The sliding circumferential surface is adapted to fuse with the inner surface of the bore at a predetermined fused temperature, so that the piston fuses with respect to the cylinder along the sliding circumferential surface thereby effectively creating a gas-tight permanent closure between the first chamber and the second chamber, thereby preventing the first fluid from escaping from the first chamber into the second chamber.

10 Claims, 1 Drawing Sheet

PISTON ACTUATED PRESSURE REDUCING VALVE

BACKGROUND OF THE INVENTION

1. Field of the Invention

The present invention relates to a fluid pressure piston actuated control valve. More specifically, the present invention relates to a fluid pressure piston actuated control valve, where the piston has a sliding circumferential surface which is received in an inner surface of a cylindrical bore and is adapted to fuse with the inner surface of the bore at a predetermined fused temperature.

2. Discussion of the Related Art

Fluid pressure control valves are known, for example, from U.S. Pat. No. 3,982,559 to Ochs, which discloses a fluid pressure control valve that utilizes a diaphragm 34–36 to actuate a valve stem 25 to move a valve head 24 to and from the valve seat 16 to open and close the valve.

If the fluid being regulated by the valve is a flammable fluid, for example, hydrogen, natural gas, propane, etc., it is important to maintain the valve fluid within the housing to prevent the addition of fuel to the fire to reduce the likelihood of an explosion or further fueling of the fire. In the event of a fire, the temperature of the valve housing increases, which will eventually cause the elastomeric diaphragm to melt, thus providing a leakage path for the hydrogen gas, or other flammable fluid, disposed inside of the valve to leak under pressure to the atmosphere. It has been proposed to substitute a metal diaphragm for the elastomeric diaphragm. However, a metal diaphragm, while safer with respect to a fire hazard than an elastomeric diaphragm, is quite limited in its capacity ratings which limits the selection of valves to large expensive valves with very limited capacity and regulation accuracy.

SUMMARY OF THE INVENTION

Accordingly, it is an object of the present invention to provide a fluid pressure control valve that can be utilized to regulate the flow of a flammable fluid while simultaneously complying with fire safety regulations.

In accordance with the preferred embodiment demonstrating further objects, features and advantages of the present invention, the valve includes a housing that has an inlet and an outlet for the flow of a first fluid therethrough. A cup-shaped cover dome is attached to the housing and has an internal cylindrical bore. A valve stem has a plug to regulate the flow of the first fluid through the housing. A piston is connected to the valve stem. The piston is reciprocatably received within the cylindrical bore of the cover dome to define a first chamber disposed between the piston and the housing and a second chamber disposed between the piston and the cover dome. The piston has a sliding circumferential surface received in an inner surface of the cylindrical bore wherein the sliding circumferential surface is adapted to fuse with the inner surface of the bore at a predetermined fused temperature so that the piston fuses with respect to the cylinder along the sliding circumferential surface thereby effectively creating a gas-tight permanent closure between the first chamber and the second chamber thereby preventing gas from escaping from the first chamber into the second chamber.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EXEMPLARY EMBODIMENT

Figure 1:
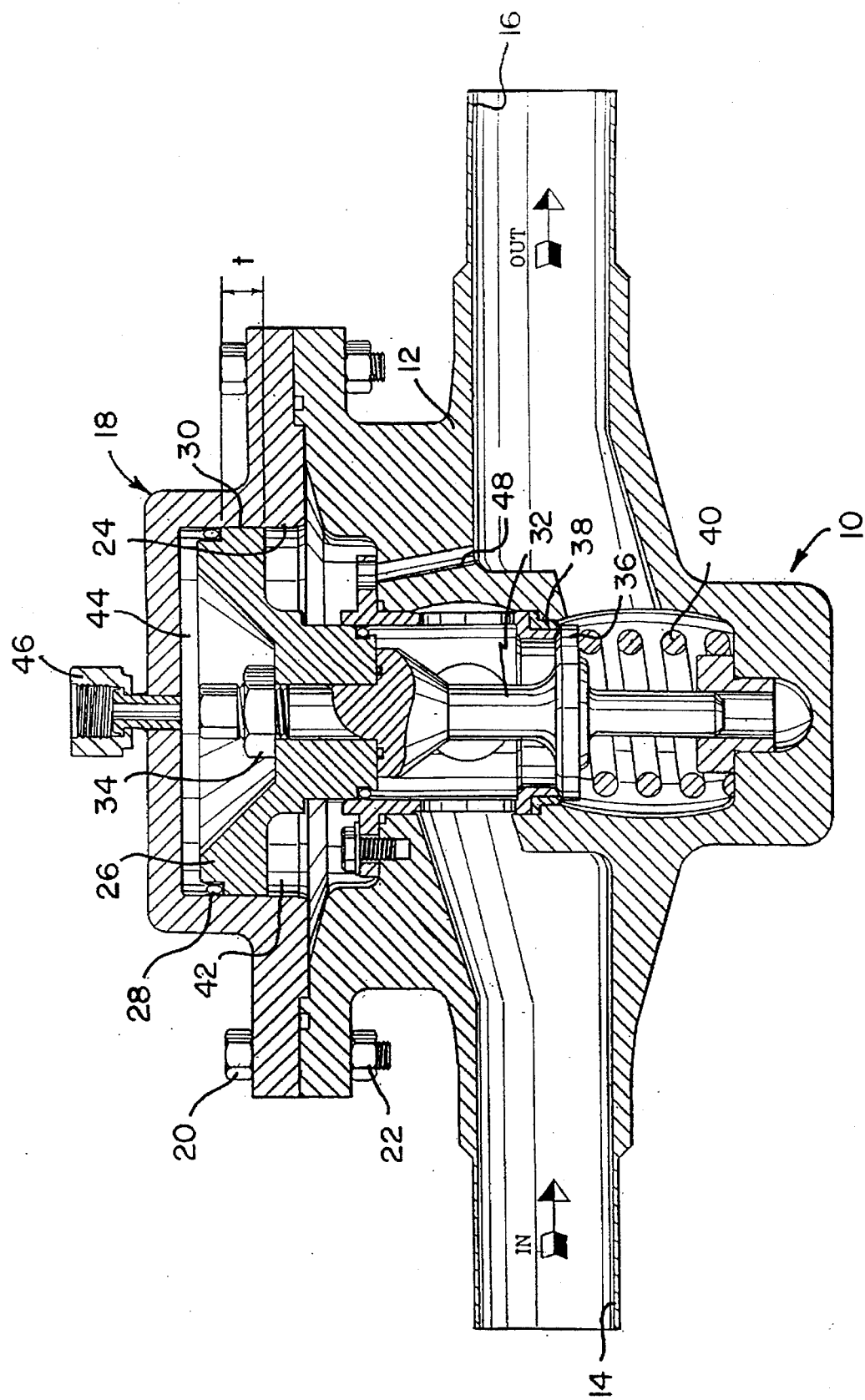
FIG. 1 is a cross-sectional view showing fluid pressure piston actuated control valve according to the present invention.

Referring now to FIG. 1, a fluid pressure control valve 10 is illustrated. The valve includes a housing 12, a valve stem 32 and a piston 26.

Housing 12 has an inlet 14 and an outlet 16. A cover dome 18 is attached to the housing, preferably by a threaded fastener 20 and a nut 22. The cover 18 has an inverted cup-shape and has an internal cylindrical bore 24. Cylindrical bore 24 preferably has a circular cross-section, but could have other cross-sectional shapes, for example, such as a triangle, rectangle, or even other non-polygonal shapes. Piston 26 is reciprocatably mounted within the cylindrical bore 24 of the cup-shaped cover dome 18. A dynamic seal 28 is disposed between a sliding circumferential surface 30 of the piston 26 and an inner surface of the cylindrical bore 24. The seal 28 is preferably a metal energized teflon coated dynamic piston ring seal which is currently available from Helicoflex Company of Columbia, S.C. Valve stem 32 is fixedly attached to the piston 26, for example, by a nut threaded connection 34. Valve stem 32 includes a plug 36 to regulate the flow of a first fluid, preferably hydrogen, through the housing. Plug 36 is received on a seat 38 mounted within the housing to close the valve. A spring 40 normally biases the valve stem 32 such that plug 36 is in a closed position with respect to the seat 38 so that no fluid will flow through the housing.

Piston 26 is reciprocatably received within the cover dome 18 and defines a first chamber 42 disposed between the piston 26 and the housing 12 and a second chamber 44 disposed between the piston 26 and the cover dome 18. The second chamber 44 is in fluid communication with a second pressure regulating fluid via port 46. The first chamber 42 is in fluid communication with the outlet 16 via a duct 48. When the pressure of the regulating fluid reaches a predetermined value, the biasing force of the spring 40 is overcome to open the valve. In other words, the valve plug 36 moves in a downward direction away from seat 38 to permit the flow of fluid from the inlet 14 to the outlet 16.

The sliding circumferential surface 30 of the piston 26 is received in an inner surface of the cylindrical bore 24. The sliding circumferential surface has a predetermined thickness t which is sized so that surface 30 of the piston is adapted to fuse with the inner surface of the bore at a predetermined temperature. Therefore, the piston 26 fuses with respect to the cylinder along the sliding circumferential surface 30 thereby effectively creating a gas-tight permanent closure between the first chamber 42 and the second chamber 44 thereby preventing gas from escaping from the first chamber into the second chamber. The piston 26 and cover dome 18 are preferably made of stainless steel to permit an effective fusing between these two members. Of course, other materials may be used so long as those materials permit an effective fusing between the piston and the cylinder when the ambient temperature reaches a predetermined minimal value. The predetermined fuse temperature corresponds to a temperature that represents a fire condition either within or outside of the valve housing. The temperature can vary, for example, from 500° F. to 1700° F.

Having described the presently preferred exemplary embodiment of a new and improved piston actuated pressure reducing valve, in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A valve comprising:

a housing having an inlet and an outlet for the flow of a first fluid therethrough;

a cup-shaped cover dome attached to said housing, said cover dome having a cylindrical bore;

a valve stem having a plug to regulate the flow of said first fluid through said housing;

a piston connected to said valve stem, said piston being reciprocatably received within said cylindrical bore of said cover dome to define a first chamber disposed between said piston and said housing and a second chamber disposed between said piston and said cover dome, said piston having a sliding circumferential surface received in an inner surface of said cylindrical bore, wherein said sliding circumferential surface is made of a material that is adapted to fuse with said inner surface of said bore at a predetermined fused temperature, so that said piston fuses with respect to said cylinder along said sliding circumferential surface thereby effectively creating a fluid-tight permanent closure between said first chamber and said second chamber, thereby preventing said first fluid from escaping from said first chamber into said second chamber.

2. The valve according to claim 1, wherein said second chamber is in fluid communication with a second pressure regulating fluid.

3. The valve according to claim 2, wherein said first chamber is in fluid communication with said first fluid.

4. The valve according to claim 3, further comprising a dynamic seal being disposed between said piston sliding circumferential surface and said inner surface of said cylindrical bore.

5. The valve according to claim 3, wherein said sliding circumferential surface has a predetermined minimum thickness to permit said fusing.

6. The valve according to claim 4, wherein said sliding circumferential surface has a predetermined minimum thickness to permit said fusing.

7. The valve according to claim 1, wherein said first fluid is flammable.

8. The valve according to claim 7, wherein said first fluid is hydrogen.

9. The valve according to claim 4, wherein said first fluid is flammable.

10. The valve according to claim 9, wherein said first fluid is hydrogen.

* * * * *